Patented Jan. 11, 1944

2,339,218

UNITED STATES PATENT OFFICE 2,339,218

SUBSTITUTED PIMELIC ACIDS

Herman A. Bruson, Philadelphia, Pa., assignor to The Resinous Products & Chemical Company, Philadelphia, Pa., a corporation of Delaware No Drawing. Application June 14, 1941, Serial No. 398,064

4 Claims. (Cl. 260—515)

This invention relates to γ-substituted pimelic acids having the formula

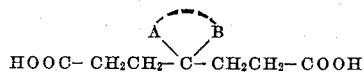

HOOC—CH$_2$CH$_2$—C—CH$_2$CH$_2$—COOH wherein A and B each represent ethenoid carbon atoms in an unsaturated carbocycle, and to a process for their preparation.

This application is a continuation-in-part of my copending application, Serial No. 391,501, filed May 2, 1941, which issued on April 21, 1942, as U. S. Patent 2,080,058.

These acids are new substances which are useful in the preparation of resins of the alkyd or nylon type. In the form of their esters they are useful as plasticizers for such plastics as nitrocellulose or ethyl cellulose, as well as other plastic or resinous products and coatings.

According to this invention γ-substituted pimelic acids of the above formula are obtained by hydrolyzing the reaction product obtained by condensing acrylonitrile in the presence of an alkaline condensing agent with a cyclic compound having a reactive methylene group between two ethenoid carbon atoms of an unsaturated carbocycle.

The preparation of the said reaction products is described in detail in application Serial No. 391,501, which issued on April 21, 1942 as U. S. Patent 2,080,058. According to the method there disclosed a cyclic compound having a reactive methylene group between two carbocyclic ethenoid groups may be reacted in the presence of an alkaline condensing agent with at least two mols of acrylonitrile to form poly-β-cyanoethyl derivatives of the cyclic compound. Typical cyclic compounds which may be reacted include anthrone, cyclopentadiene, indene, fluorene, and homologues and substitution products thereof. It may be further noted that carboxyethyl substituents may be introduced in the cycles as a result of the addition of cyanoethyl groups on other than the reactive methylene group between ethenoid carbon atoms. Among the alkaline condensing agents which are effective for promoting this reaction are the oxides, hydroxides, hydrides, amides, and alcoholates of the alkali metals or the alkali metals themselves. There may also be used strongly basic non-metallic hydroxides such as the quaternary ammonium hydroxides. Of these a particularly effective condensing agent is the aqueous solution containing 40% of trimethyl benzyl ammonium hydroxide, which is commercially available under the trade name "Triton B." The quantity of alkaline condensing agent required is relatively small, amounts of the order of 1% to 10% on the combined weight of the reactants usually being sufficient. One or several of these alkaline materials are suspended or, preferably, dissolved in the reactive carbocyclic compound itself or in a solution thereof in an inert liquid such as dioxane, ether, benzene, or in a liquid which is less reactive than the reacting components, such as water or tertiary butyl alcohol. The condensation takes place readily at temperatures from about 0° to about 80° C., although initial temperatures of 25° C. to 60° C. are preferred. The condensation is usually exothermal so that cooling, at least during the initial part of the reaction, is generally advantageous in order to control the vigor of the reaction and to prevent undesired polymerization or side reactions. After the reaction is completed, the condensation product may be isolated and purified or it may be utilized in crude form for the hydrolysis.

This step is carried out by heating the condensation product with water in the presence of a hydrolytic agent until ammonia has been eliminated. For this purpose there may be used a solution of an alkali such as sodium hydroxide or potassium hydroxide or of an aqueous non-oxidizing mineral acid such as hydrochloric or sulfuric acid. The alkalies, however, are preferred. Temperatures at about the boiling point of water are generally suitable, but higher temperatures may be used when the hydrolysis is performed under pressure.

In the following examples typical procedures are given for the preparation of various typical acids. In the preparation of the β-cyanoethyl derivatives trimethyl benzyl ammonium hydroxide is shown as the alkaline condensing agent, but it is obvious that this preferred agent may be replaced with other condensing agents such as sodium methylate, potassium tertiary amylate, potassium hydroxide, sodium metal, sodium oxide, sodium hydride, dimethyl dibenzyl ammonium hydroxide, tetraethyl ammonium hydroxide, etc.

Example 1

*Preparation of 9,9-di-(β-carboxy-ethyl)-fluorene*

To a solution of 166 g. of fluorene (1 mol) in 500 g. of dioxane there was added 6 g. of aqueous 40% trimethyl benzyl ammonium hydroxide. The mixture was vigorously stirred while 111.3 g. of acrylonitrile (2.1 mols) was added dropwise thereto during a period of one hour. The reaction temperature was maintained at 33° to 38° C. during the addition by external cooling. After all the acrylonitrile had been added and the exothermal reaction had ceased, the mixture was stirred and heated for two hours at 40-45° C. It was then cooled, neutralized with dilute hydrochloric acid, taken up in its own volume of ethylene dichloride and washed several times with water. The ethylene dichloride layer was evaporated under reduced pressure on a steam bath leaving 249 g. of residue. Upon recrystallization from ethanol this yielded 177 g. of crystalline product, which, when pure, formed colorless crystals melting at 121° C.

A mixture of 40 g. of the above-purified crystals, 16 g. of sodium hydroxide, and 400 cc. of water was rapidly stirred and boiled under reflux for 12 hours. The solution was then cooled, filtered and the filtrate acidified with concentrated hydrochloric acid. The product separated as a white, gelatinous precipitate. The mixture was heated to boiling, filtered while hot, and the precipitate washed with hot water and dried. The yield was 42 g. of a white powder. Upon recrystallization from alcohol the compound formed colorless crystals melting at 273-274° C. and having the formula

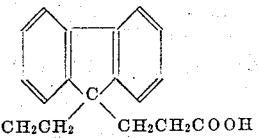

Example 2

*Preparation of 1,1,3-tri-(β-carboxy-ethyl)-indene*

To a mixture of 69.5 g. of indene (0.6 mol), 100 g. of dioxane, and 4 g. of aqueous 40% trimethyl benzyl ammonium hydroxide there was added dropwise during two hours 95.4 g. of acrylonitrile (1.8 mol), while the reaction mixture was stirred and cooled to 25-30° C. After the addition, the mixture was stirred at room temperature for an hour and the dark solution acidified with dilute hydrochloric acid and mixed with an equal volume each of water and ethylene dichloride. The aqueous layer was discarded and the ethylene dichloride layer washed until acid-free and then evaporated under reduced pressure on a steam bath. The residual oil, weighing 147 g., was then then distilled in high vacuo. The fraction boiling at 280-290° C./1-2 mm. was a viscous reddish oil which gradually crystallized on standing. Without further purification, 27.5 g. of this fraction was mixed with 225 cc. of water and 23 g. of potassium hydroxide. The mixture was stirred vigorously and boiled under reflux for three hours. At the end of this time, the clear, dark red solution obtained was treated with charcoal, filtered and the filtrate acidified with concentrated hydrochloric acid. The product separated as a resinous solid which could be recrystallized from hot water. The yield was 30 g. After several recrystallizations from hot water with the use of charcoal to remove color, the product formed colorless crystals melting at 161-162° C., having the formula

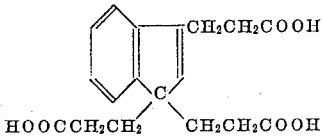

Example 3

*Preparation of 9,9-di(β-carboxy-ethyl)-anthrone*

15.9 g. of acrylonitrile was added dropwise during 30 minutes to a stirred solution consisting of 29.1 g. of anthrone, 100 g. of dioxane, and 3 g. of aqueous 40% trimethyl benzyl ammonium hydroxide while the reaction temperature was maintained at 40° C. by external cooling. The deep red solution obtained was stirred for 24 hours at room temperature. It was then acidified with dilute hydrochloric acid whereupon the color disappeared and the product separated in pale yellow crystals which were filtered off in a yield of 40 g. After recrystallization from glycol monoethyl ether the product was obtained in the form of colorless prisms melting at 215° C.

A mixture consisting of 27 g. of the above recrystallized product, 120 cc. of water, 70 cc. of alcohol and 12 g. of sodium hydroxide was boiled under reflux for seven hours. The solution was then cooled, filtered, and the filtrate acidified with 30 g. of concentrated hydrochloric acid. The product precipitated as an oil which rapidly solidified to a crystalline solid in a yield of 27 g. It is difficultly soluble in water, but very soluble in alcohol. Upon recrystallization from dilute alcohol (75% H2O+25% ethanol), it separated in colorless flaky crystals having the formula

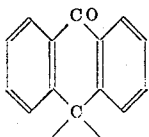

The compound shows no definite melting point but darkens, softens, and gradually decomposes between 220-230° C.

Example 4

*Preparation of hexa-(β-carboxy-ethyl)-cyclopentadiene*

To a mixture of 66 g. of cyclopentadiene, 200 g. of dioxane and 20 g. of aqueous 40% trimethyl benzyl ammonium hydroxide there is added dropwise 318 g. of acrylonitrile during the course of 3½ hours while the reaction mixture is stirred and cooled to between 30° and 35° C. After all the acrylonitrile has been added, the mixture is stirred for 18 hours at 25-30° C. to complete the reaction. It is then made slightly acid with dilute hydrochloric acid and the crystalline product filtered off by suction and washed with a little acetone. There is obtained 70 g. of a pale cream-colored powder which, after recrystallization from glycol monoethyl ether, forms colorless crystals melting at 203° C.

A mixture consisting of 38.4 g. of the above compound, 320 cc. of water, and 32 g. of sodium hydroxide was boiled under reflux for six hours. It was then treated with charcoal and filtered. The filtrate was acidified with hydrochloric acid and evaporated to dryness on a steam bath. The residue was powdered and extracted with ethanol. The filtered alcoholic extract was then evaporated to dryness under reduced pressure. The residue was a dark syrup which, when mixed with a little water and allowed to stand, gradually crystallized. The crystals were filtered off and washed with methyl propyl ketone. The compound is extremely soluble in water and in alcohol. It melted at 180–181° C. and has the formula

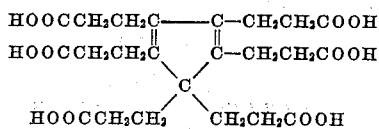

I claim:

1. As a new product, a carbocyclic organic compound in which two β-carboxyethyl radicals are attached to a carbon atom which is directly joined to two ethanoid carbon atoms in an unsaturated carbocycle.

2. 9,9,-di-(β-carboxy-ethyl)-fluorene

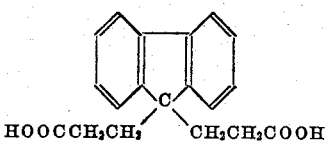

3. 1,1,3-tri-(β-carboxy-ethyl)-indene

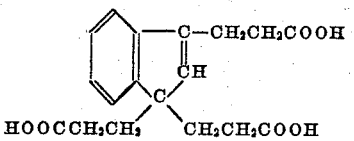

4. 1,1,2,3,4,5-hexa-(β-carboxy-ethyl)-cyclopentadiene

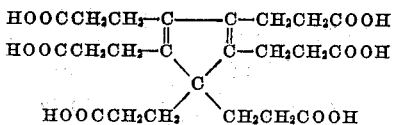

HERMAN A. BRUSON.